(12) United States Patent
Kim

(10) Patent No.: US 8,446,547 B2
(45) Date of Patent: May 21, 2013

(54) LIQUID CRYSTAL DISPLAY DEVICE INCLUDING BACK LIGHT UNIT HAVING LED ARRAY

(75) Inventor: Youngsam Kim, Jung-ri (KR)

(73) Assignee: LG Display Co., Ltd., Seoul (KR)

( * ) Notice: Subject to any disclaimer, the term of this patent is extended or adjusted under 35 U.S.C. 154(b) by 121 days.

(21) Appl. No.: 12/938,916

(22) Filed: Nov. 3, 2010

(65) Prior Publication Data

US 2011/0134365 A1    Jun. 9, 2011

(30) Foreign Application Priority Data

Dec. 3, 2009  (KR) .......................... 10-2009-0119378
Aug. 18, 2010 (KR) .......................... 10-2010-0079687

(51) Int. Cl.
*G02F 1/1335* (2006.01)

(52) U.S. Cl.
USPC .................. 349/65; 349/61; 349/62; 362/612

(58) Field of Classification Search
None
See application file for complete search history.

(56) References Cited

U.S. PATENT DOCUMENTS

2006/0220040 A1*  10/2006  Suzuki ............................. 257/89
2008/0106912 A1*   5/2008  Yeom ............................ 362/613
2009/0256987 A1*  10/2009  Jeon et al. ....................... 349/58

FOREIGN PATENT DOCUMENTS

CN    1828389 A    9/2006
CN    101556403 A  10/2009

OTHER PUBLICATIONS

Office Action issued in corresponding Chinese Patent Application No. 201010572584.1, mailed Dec. 19, 2011.
Office Action issued in corresponding Chinese Patent Application No. 201010572584.1, mailed Oct. 22, 2012.

* cited by examiner

*Primary Examiner* — Thanh-Nhan P Nguyen
(74) *Attorney, Agent, or Firm* — Brinks Hofer Gilson & Lione

(57) ABSTRACT

The present disclosure relates to a back light unit having an LED array structure for reducing light leakage problem at edge portion. A liquid crystal display device comprises a liquid crystal display panel; an optical sheet disposed under the liquid crystal display panel; and an LED array having red LED, green LED and blue LED are sequentially arrayed under the optical sheet, wherein one portion of an outermost LED of the LED array is included within an area covered by the liquid crystal display panel, and other portion of the outermost LED of the LED array is excluded from the area covered by the liquid crystal display panel.

5 Claims, 20 Drawing Sheets

LIQUID CRYSTAL DISPLAY DEVICE INCLUDING BACK LIGHT UNIT HAVING LED ARRAY

This application claims the benefit of Korea Patent Application No. 10-2009-0119378 filed on Dec. 3, 2009 and 10-2010-0079687 filed on Aug. 18, 2010, the entire contents of which is incorporated herein by reference for all purposes as if fully set forth herein.

BACKGROUND

1. Field of the Invention

The present disclosure relates to a liquid crystal display device including a back light unit. Specifically, the present disclosure relates to a back light unit having an LED array structure for reducing light leakage problem at edge portion.

2. Discussion of the Related Art

An active matrix type liquid crystal display device (or "AMLCD") represents video data using a thin film transistor (or "TFT") as the switching element. As the AMLCD can be made in a thin flat panel with light weight, it is replacing the cathode ray tube (or "CRT") in the display device market and is being applied to portable information appliances, computer devices, office automation appliances, and/or television sets.

The AMLCD comprises a liquid crystal display panel (or LCD panel), a back light unit for irradiating light to the LCD panel, a light source driving circuit for controlling the light source of the back light unit, a data driving circuit for supplying the data signals to the data lines of the LCD panel, a gate driving circuit for sequentially supplying the gate pulse (or scan pulse) to the gate lines of the LCD panel, and a timing controller for controlling the operating timing of the data driving circuit and the gate driving circuit. Recently, the light emitting diode (or LED) is being applied to the back light unit as the light source. As the temperature increases, the efficiency and the service lift time of the LED will be degraded. To solve these drawbacks, a metallic printed circuit board having advanced qualities for radiating the heat from the light source is being used for mounting the LED packages.

There are two types of LED arrays, depending to the method used for forming the LED package. One is the white LED array type in which multiple white LEDs are arrayed. The white LED array type is made by mixing the material having a yellow color material to the LED radiating a blue color. Therefore, according the color brightness distribution graph of the white LED, the white LED array type does not have even brightness distribution over RGB color bands. FIG. 1 is the graph illustrating the color brightness distribution according to the color wavelengths of the white LED array type. The other is the RGB LED array type in which red (R) LED, green (G) LED and blue (B) LED are sequentially arrayed for making a white color by mixing RGB colors. The RGB LED array type has the advantage of having back light with even color brightness distribution over all wavelengths covering R-G-B color. FIG. 2 is a graph illustrating the color brightness distribution according to the color wavelengths of the RGB LED array type. However, in the RGB LED array type, there is another problem in which color of the last arrayed LED is more brightly represented at the edge portion of the LCD panel.

For example, LED back light source may be positioned at the left side of the LCD device, and the LED back light source may has R, G and B LEDs sequentially arrayed from the lowest point of the left side. In this case, at the lowest point where the red (R) LED is disposted, the red color can be more brightly shown. This is called the redish problem. FIG. 3a is the picture illustrating the redish problem occurred at the edge type LED back light unit. FIG. 3b is the picture illustrating the redish problem occurred at the direct type LED back light unit. This redish problem is caused by that the red light from the end red LED is radiated without properly mixing with the other lights from other LEDs. To solve this problem, there is one method in which the brightness of the lastly positioned LED is lowered. However, this method may cause other problems such as the complexity problems of the circuit implementation and the manufacturing method, and high cost problems.

BRIEF SUMMARY

A liquid crystal display device comprises a liquid crystal display panel; an optical sheet disposed under the liquid crystal display panel; and an LED array having red LED, green LED and blue LED are sequentially arrayed under the optical sheet, wherein one portion of an outermost LED of the LED array is included within an area covered by the liquid crystal display panel, and other portion of the outermost LED of the LED array is excluded from the area covered by the liquid crystal display panel.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Advantages and features of the present disclosure and a method of achieving the advantages and the features will be apparent by referring to embodiments described below in detail in connection with the accompanying drawings. Hereinafter, referring to FIGS. 4 to 18B, some preferred embodiments of the present disclosure are explained in detail. However, the present disclosure is not restricted by these embodiments but can be applied to various changes or modifications without changing the technical spirit. In the following embodiments, the names of the elements are selected by considering the easiness for explanation so that they may be different from actual names.

Figure 1:
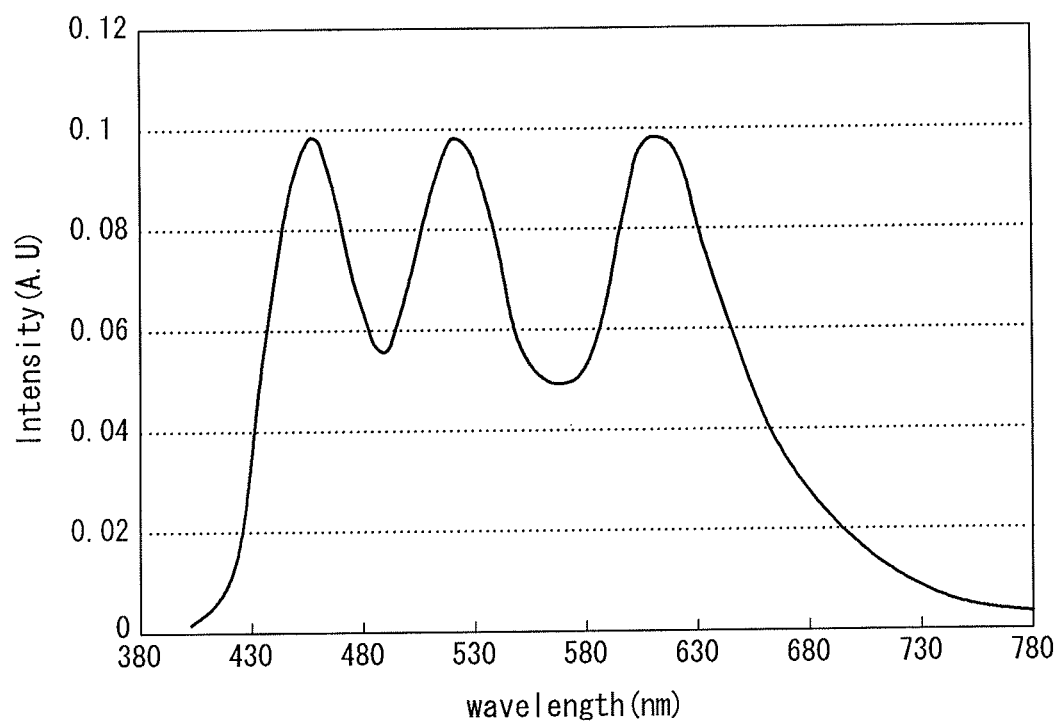
FIG. 1 is the graph illustrating the color brightness distribution according to the color wavelengths of the white LED array type in the related art.
Figure 2:
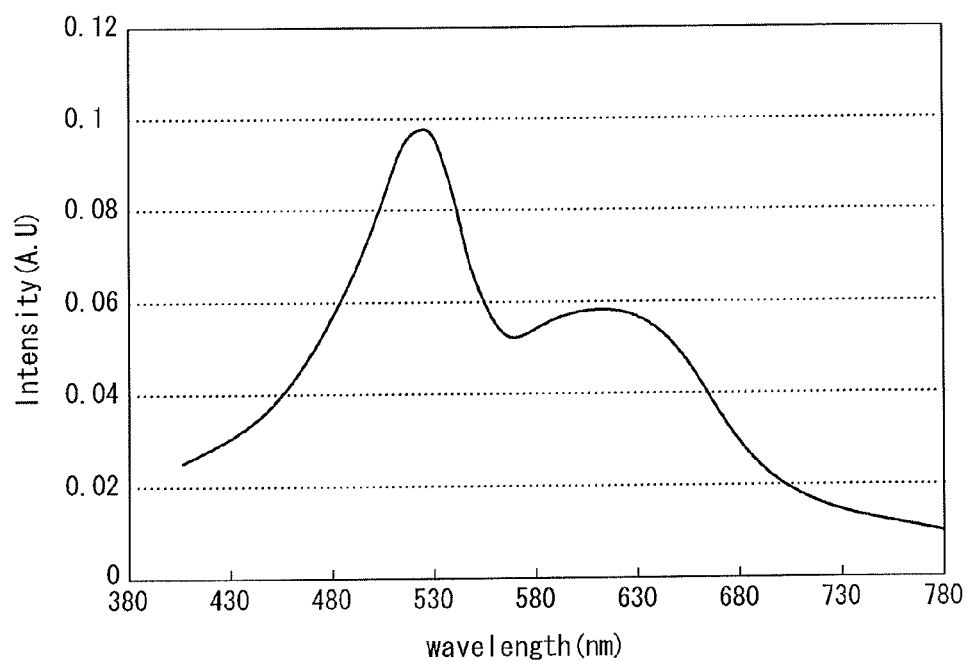
FIG. 2 is the graph illustrating the color brightness distribution according to the color wavelengths of the RGB LED array type in the related art.
Figure 3A:
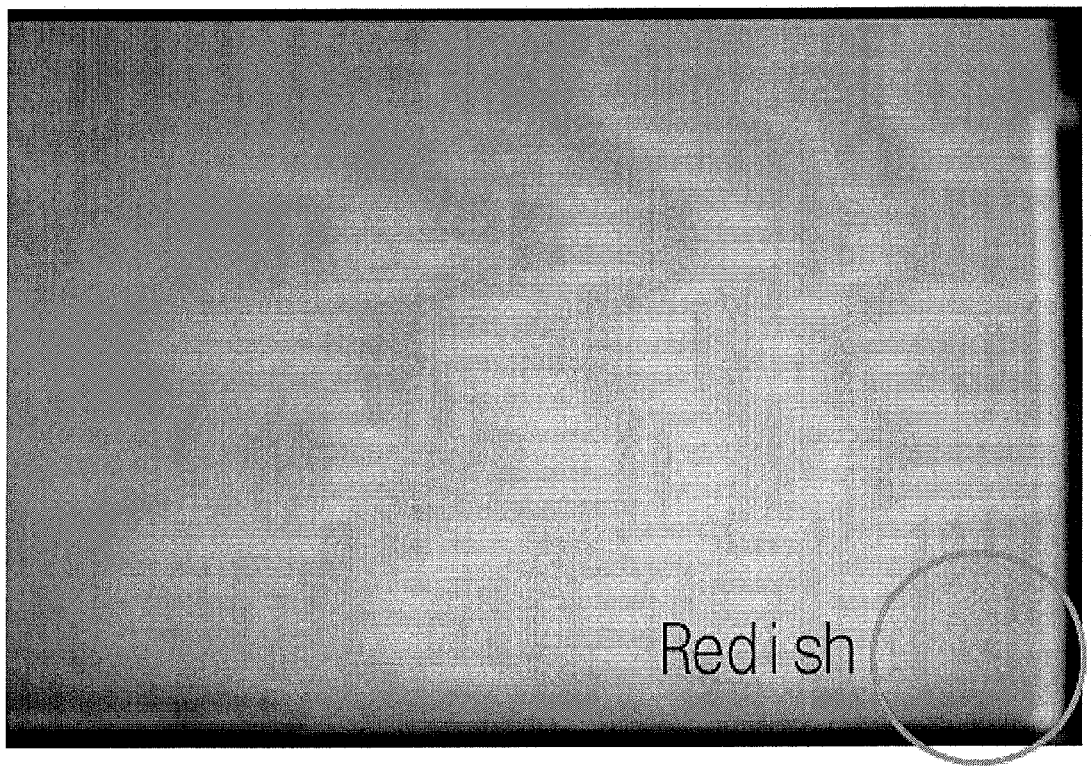
FIG. 3a is the picture illustrating the redish problem occurred at the edge type LED back light unit according to the related art.
Figure 3B:
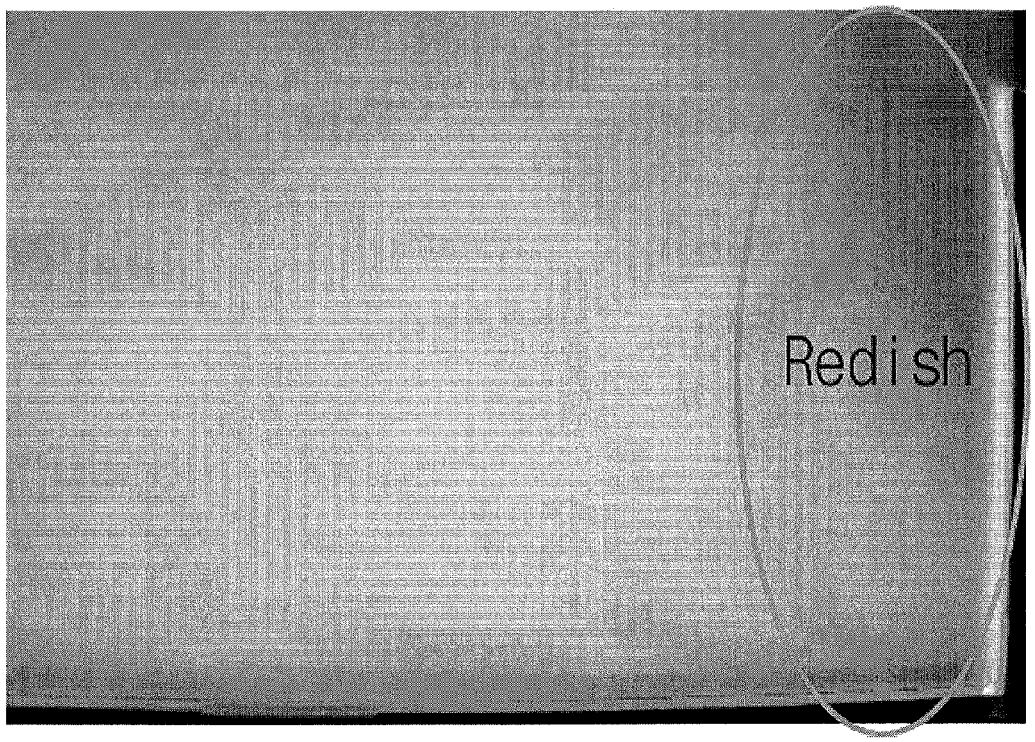
FIG. 3b is the picture illustrating the redish problem occurred at the direct type LED back light unit according to the related art.
Figure 4:
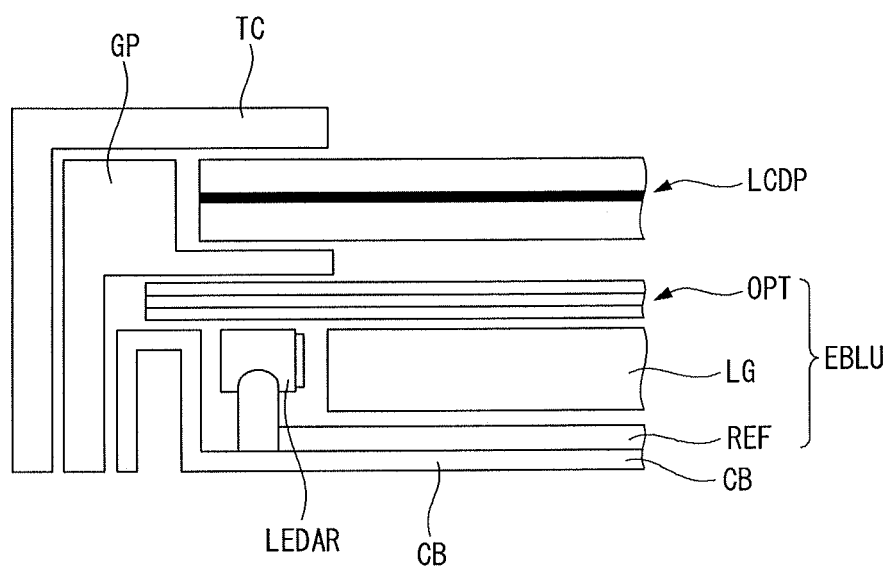
FIG. 4 is a cross-sectional view illustrating a liquid crystal display device including an edge type back light unit having the LED array according to a first embodiment of the present disclosure.

FIG. 4 is a cross-sectional view illustrating a liquid crystal display device including an edge type back light unit having the LED array according to the first embodiment of the present disclosure. The edge type back light unit EBLU having an LED array according to the first embodiment of the present disclosure comprises an LED array LEDAR radiating back light to the light guide LG. Between the light guide LG and the liquid crystal display panel LCDP, a plurality of optical sheets OPT are disposed. The optical sheets OPT may include at least one prism sheet and at least one diffusion sheet so that they diffuse the light incident from the light guide LG and refract the light path from the light incident surface to the light radiating surface substantially vertical to the light incient surface. The optical sheets OPT can further include a dual brightness enhancement film (or DBEF). The guide panel GP encloses the side portion of the LCD panel LCDP and the edge type back light unit EBLU and supports the LCD panel LCDP by positioning between the LCD panel LCDP and the optical sheets OPT. The cover bottom CB encapsules the lower portion of the edge type back light unit EBLU. Between the cover bottom CB and the light guide LG, a reflective sheet REF is disposed. The top case TC houses the sides of the LCD panel LCDP and the guide panel GP.

Figure 5:
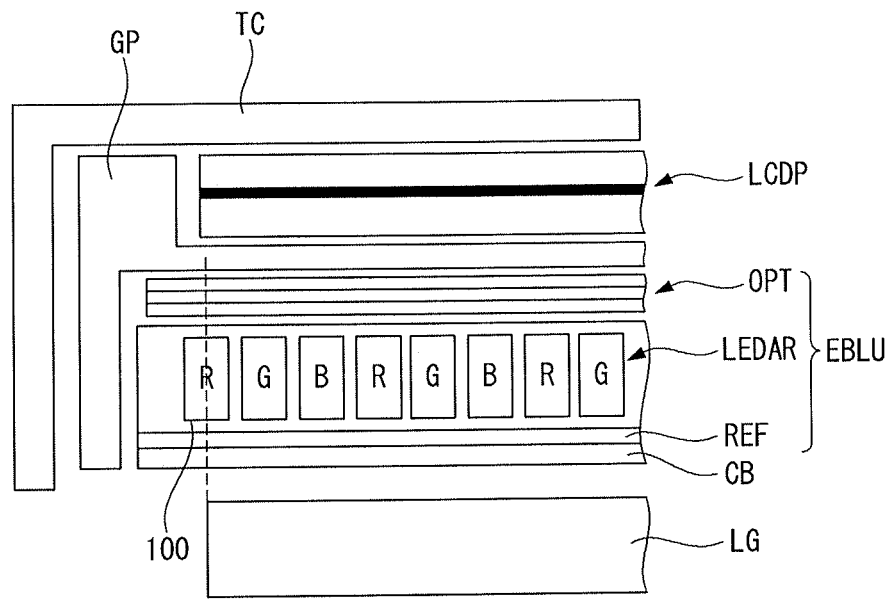
FIG. 5 is a side view illustrating the right side of the LCD device according to the present disclosure as shown in FIG. 4.

Further referring to FIG. 5, the first embodiment of the present disclosure is described in detail. FIG. 5 is a side view illustrating the right side of the LCD device according to the present disclosure as shown in FIG. 4. In the view of the arraying condition of the LED array LEDAR, the left outmost red LED 100 is disposed as the manner that its one half area is included within regions of the light guide LG, the optical film OPT and the LCD panel LCDP, and the other half is included outer region from the light guide LG, the optical film OPT and the LCD panel LCDP. With this array structure, only half light amount of the outermost LED 100 is radiated to the LCD panel LCDP through the light guide LG and the optical sheet OPT. Therefore, it is possible to solve the redishi problem occurred at the LCD panel according to the conventional technology.

In the first embodiment of the present disclosure, the shape of each LED including the LED array LEDAR may have any one of square shape or rectangular shape. Consideration is that some portion of the outermost LED is included in the region overlapped with the liquid crystal display panel LCDP by changing the LED arraying structure. The effective area ratio of the outermost LED included within the area covered by the LCD panel LCDP would be selected any range between 30% and 70% of the total area of the outermost LED size, according to the design requirement and the designer's intend. In all embodiments of the present disclosure, the selected area ratio would be 50% in convenience.

In the above mentioned first embodiment, some portions of the outermost LED 100 is included within the region covered by the light guide LG, the optical sheet OPT and the LCD panel LCDP by re-arranging the LED array LEDAR of which all of them are included within the region covered by the light guide LG, the optical sheet OPT and the LCD panel LCDP in the conventional art. To do this, there is a drawback in which the design for LED array LEDAR should be changed. Therefore, hereinafter, we will explain how to solve the redish problem with easier and simpler methods for changing arrangement of the LED.

Figure 6:
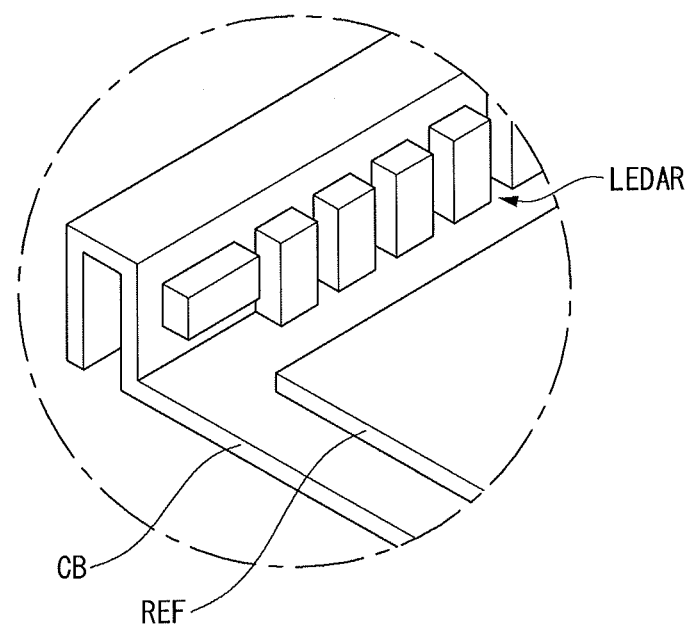
FIG. 6 is a perspective view illustrating the LED array according to the second embodiment of the present disclosure.
Figure 7:
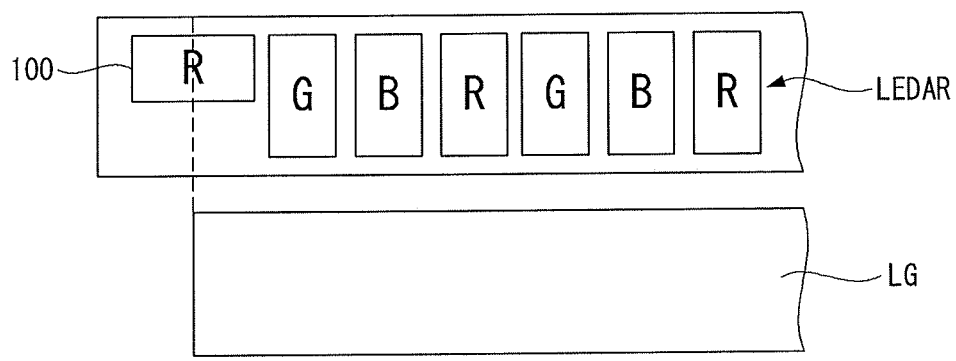
FIG. 7 is an enlarged diagram illustrating the relationship between the LED array disposed on the vertical surface of the cover bottom and the light guide according to the present disclosure.

Referring to FIGS. 6 and 7, the detail structure of the LED array according to the second embodiment of the present disclosure will be explained. FIG. 6 is a perspective view illustrating the LED array according to the second embodiment of the present disclosure. FIG. 7 is an enlarged diagram illustrating the relationship between the LED array disposed on the vertical surface of the cover bottom and the light guide according to the present disclosure. Even though the light guide LG is actually disposed in the same plane with the LED array LEDAR, FIG. 7 illustrates the light guide LG as being under the LED array LEDAR to show the position relationship between the LED array LEDAR and the light guide LG.

When the vertically rectangular LEDs are arrayed in manner of R-G-B sequence and then the red LED 100 is positioned at the first (or at the last), in order to prevent the redish problem, the first (or the last) red LED 100 is disposed in horizontal rectangular shape. In other word, after arraying all R-G-B LEDs of the LED array LEDAR are vertically as the conventional art, just outermost red LED 100 is changed as to be horizontal direction.

When the first (or the last) red LED 100 may be vertically disposed as the other LEDs, all LEDs of the LED array LEDAR are included within the region covered by the light guide LG and the LCD panel LCDP. In this structure, the light from the first (or the last) red LED is mixed with the right side green LED at the right side, but it is not mixed with any other color LED at the left side because there is no LED at the left side of the first red LED. As a result, the red color is springly radisated at the left side of the light guide LG and the LCD panel LCDP. However, as shown in FIGS. 6 and 7, by rearranging the first (or the last) red LED 100 in horizontally long direction, the one half of the red LED 100 is positioned within the region covered by the light guide LG and the LCD panel LCDP, but the other half of the red LED 100 is excluded from the region covered by the light guide LG and the LCD panel LCDP. Therefore, the effective light amount of the first (or the last) red LED 100 will be reduced in half and the redish is remarkably reduced.

In the second embodiment of the present disclosure, consideration is that some portion of the outermost LED is included in the region overlapped with the liquid crystal display panel LCDP by only changing the outermost LED in horizontally long direction. The effective area ratio of the outermost LED included within the area covered by the LCD panel LCDP would be selected any range between 30% and 70% of the total area of the outermost LED size, according to the design requirement and the designer's intend. In all embodiments of the present disclosure, the selected area ratio would be 50% in convenience.

Figure 8:
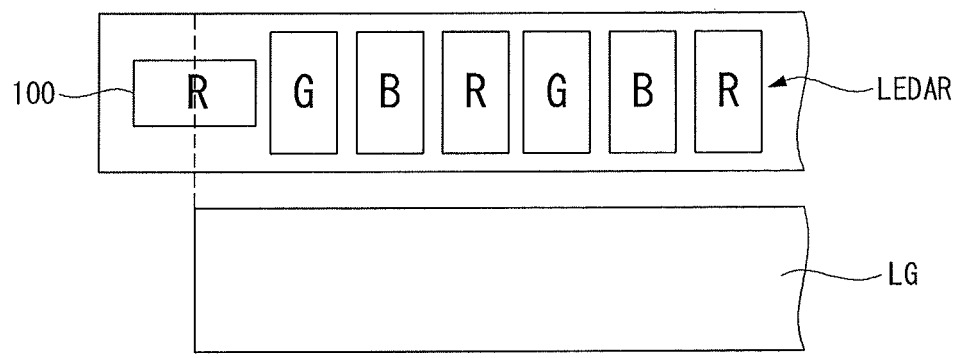
FIG. 8 is a diagram illustrating the LED array according to the third embodiment of the present disclosure.

As the third embodiment of the present disclosure, an LED array as shown in the FIG. 8 may be considered. FIG. 8 is a diagram illustrating the LED array according to the third embodiment of the present disclosure. Even though the light guide LG is actually disposed in the same plane with the LED array LEDAR, FIG. 8 illustrates the light guide LG as being under the LED array LEDAR to show the position relationship between the LED array LEDAR and the light guide LG.

In the third embodiment for the LED array LEDAR of the present disclosure has the same structure in which the first (or the last) red LED 100 is disposed in horizontally long direction, as the second embodiment. However, the location of the red LED 100 may be different. In the second embodiment, the outermost red LED 100 is located at upper position so that it is closer to the optical sheet OPT. However, in the third embodiment, the outermost red LED 100 is located at the middle portion of the other LEDs. Therefore, the distance from the outermost red LED 100 to the LCD panel LCDP is longer than the distance according to the second embodiment, so that the redish problem can be more effectively reduced.

Figure 9:
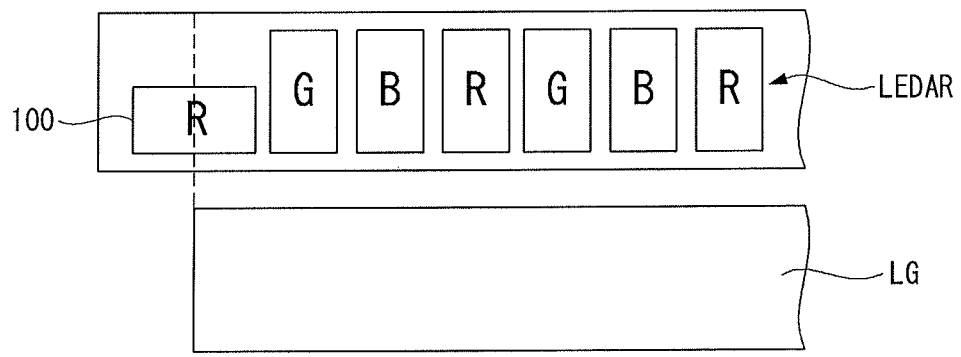
FIG. 9 is a diagram illustrating the LED array according to the fourth embodiment of the present disclosure.

More preferably, there is an LED array as shown in FIG. 9. FIG. 9 is a diagram illustrating the LED array according to the fourth embodiment of the present disclosure. The LED array structure of the fourth embodiment has the same structure in which the first (or the last) red LED 100 is disposed in horizontally long direction, as the second or the third embodiment. However, as a difference, the horizontally long direction red LED 100 is located at the bottom position of the other vertically long direction LEDs. Therefore, the red LED 100 will be positioned farest from the optical films OPT and the LCD panel LCDP. The LED array according to the fourth embodiment has a merit to most effectively reduce the redish problem.

Figure 10:
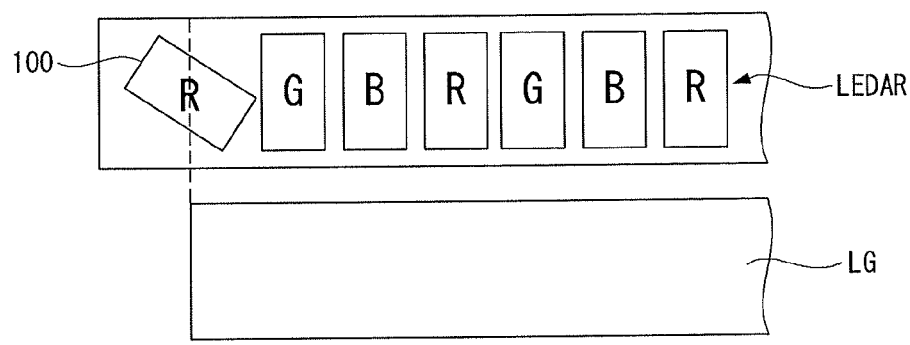
FIG. 10 is a diagram illustrating the LED array according to the fifth embodiment of the present disclosure.
Figure 11:
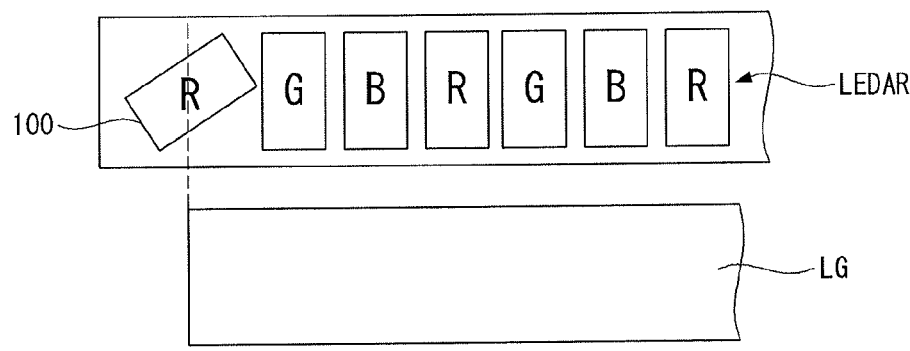
FIG. 11 is a diagram illustrating the LED array according to the sixth embodiment of the present disclosure.

For further variations of the fourth embodiment, the LED arrays can be implemented as shown in FIGS. 10 and 11. FIG. 10 is a diagram illustrating the LED array according to the fifth embodiment of the present disclosure. FIG. 11 is a diagram illustrating the LED array according to the sixth embodiment of the present disclosure. In the fifth and sixth embodiments, the first (or the last) red LED 100 is disposed at diagonally long direction. In the fifth embodiment, the half portion of the first (or the last) LED 100 within the light guide LG area is positioned at the farther location from the optical sheet OPT. In the sixth embodiment, the half portion of the first (or the last) LED 100 within the light guide LG area is positioned at the closer location to the optical sheet OPT. The LED array according to the fifth embodiment shown by FIG. 10 can more effectively solve the redish problem than the sixth embodiment.

Figure 12A:
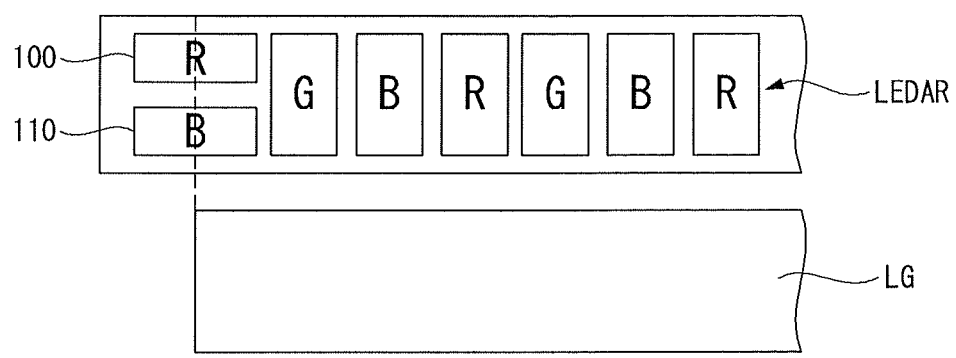
FIGS. 12A to 12D are diagrams illustrating the LED arrays according to the seventh embodiment of the present disclosure.
Figure 12B:
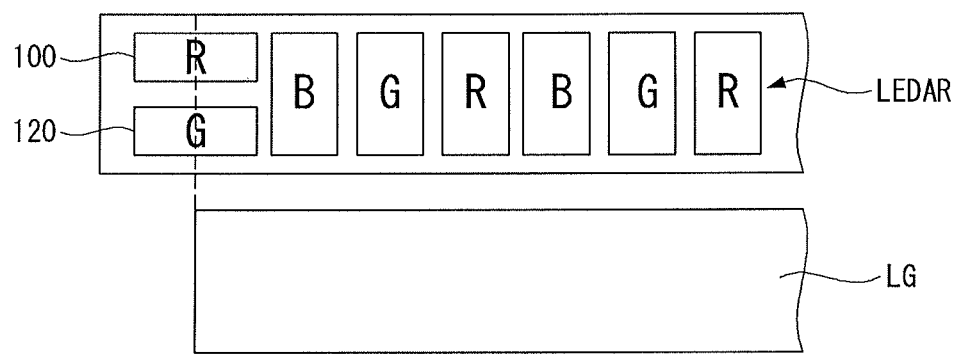

The examples of the LED array according to the second embodiment to the sixth embodiment are related to the morphological method for mounting the first (or the last) red LED 100. The following seventh embodiment is for solving the redish problem by adding additional blue LED or green LED in addition to the change for the mounting shape of the first (or the last) red LED 100. FIGS. 12A to 12D are diagrams illustrating the LED arrays according to the seventh embodiment of the present disclosure. FIG. 12E is a perspective view illustrating the LED array according to the seventh embodiment of the present disclosure.

For the seventh embodiment, an additional blue LED 110 is located at the empty space under the first (or the last) red LED 100 disposed in horizontally long direction at the second embodiment. In this case, referring to the array condition of the left LEDs, R-G-B are arrayed in triangular pattern. Like the first (or the last) red LED 100, the additional blue LED 110 is disposed in the manner that one half portion of the additional blue LED 110 is included in the area covered by the light guide LG and the LCD panel LCDP, and other half portion is excluded from the area covered by the light guide LG and the LCD panel LCDP. Therefore, the lights radiated from the first red LED 100 and the additional blue LED 110 are mixed each other to more effectively reduced the redish problem. Here, for the most important thing, if the LED array has the arraying pattern of R-G-B, the LED arrays would be the same as shown in FIG. 12A. However, if the LED array has the arraying pattern of R-B-G, an additional green LED 120 would be preferably disposed at the empty space under the first (or the last) red LED 100, as shown in FIG. 12B.

Figure 12C:
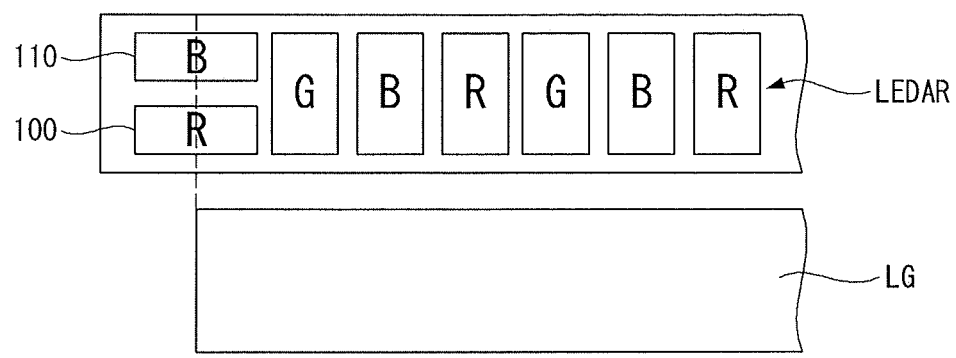
Figure 12D:
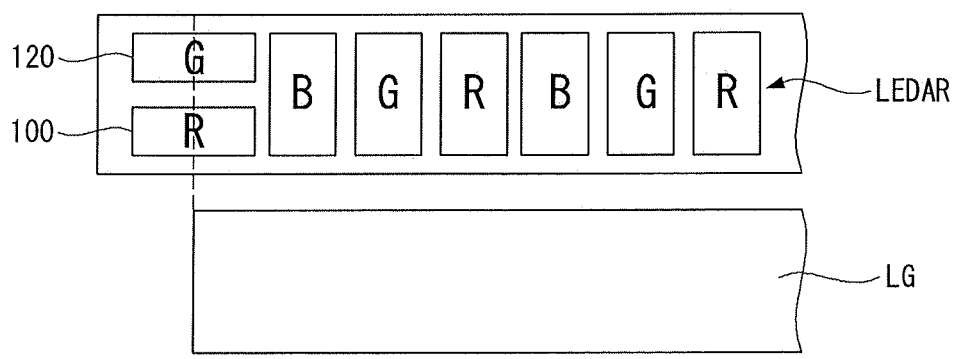
Figure 12E:
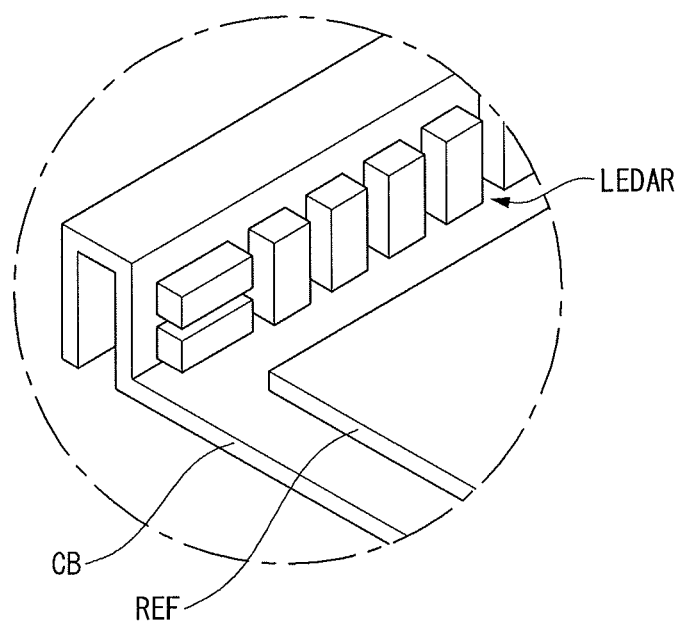
FIG. 12E is a perspective view illustrating the LED array according to the seventh embodiment of the present disclosure.

Furthermore, in the seventh embodiment, as shown in the FIG. 12C, the LED array has the additional blue LED 110 at the empty space over the first (or the last) red LED 100 disposed in horizontally long direction at the fourth embodiment. Otherwise, as shown in FIG. 12D, when the LED array LEDAR has the R-B-G pattern, the LED array can have the additional green LED 120 at the empty space over the first (or the last) red LED 100. In other words, in the empty space under or over the outermost LED disposed in horizontally long direction, an additional LED is added in the manner that the combination of the additional LED, the outermost LED and the nearest vertically long disposed LED has the RGB combination.

Figure 12F:
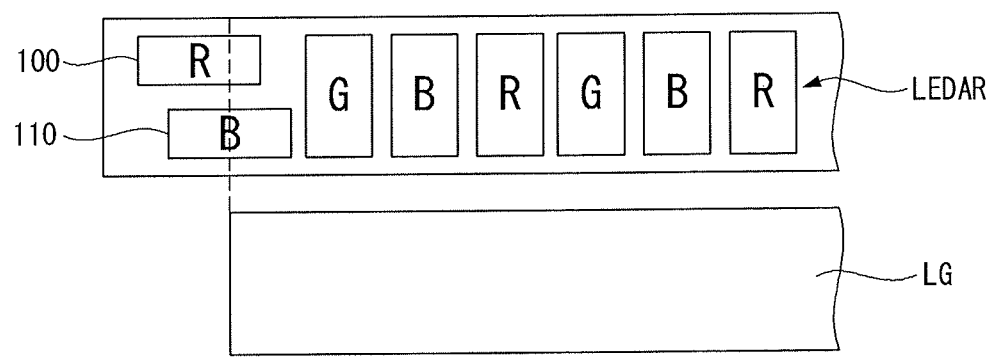
FIG. 12F is a diagram illustrating the LED array according to the eighth embodiment of the present disclosure.
Figure 13A:
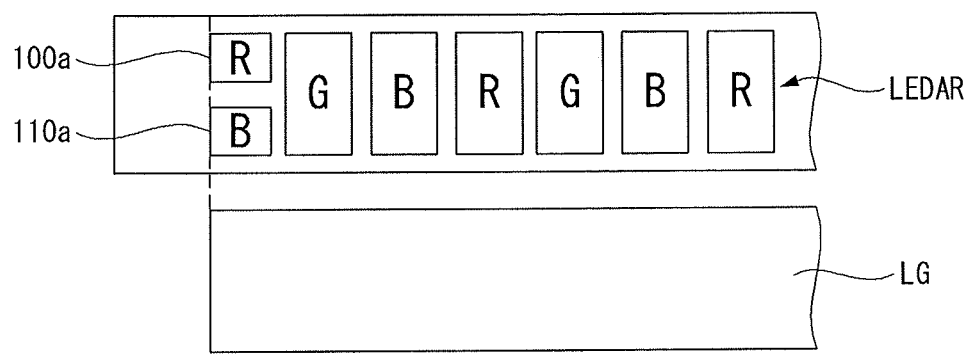
FIGS. 13A to 13D are diagrams illustrating the LED arrays according to the ninth embodiment of the present disclosure.
Figure 13B:
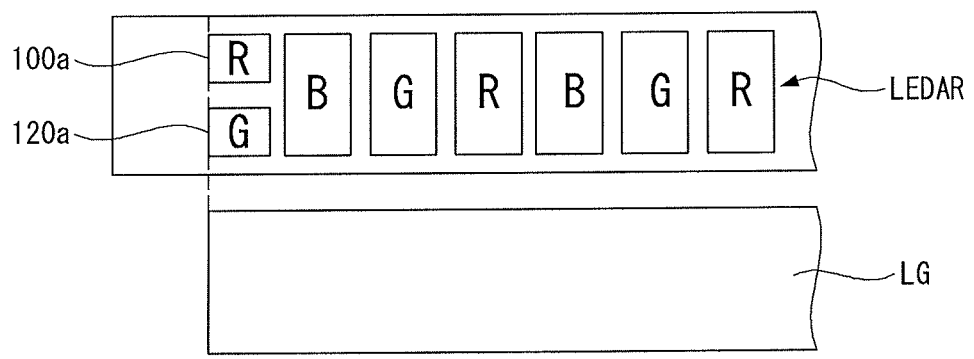
Figure 13C:
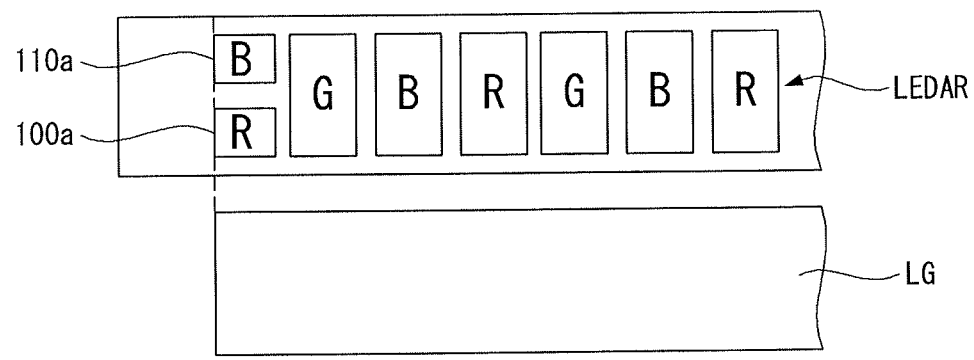
Figure 13D:
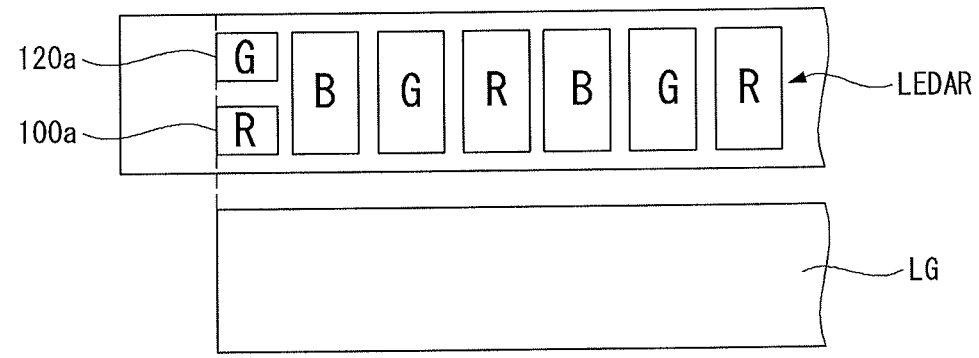
Figure 13E:
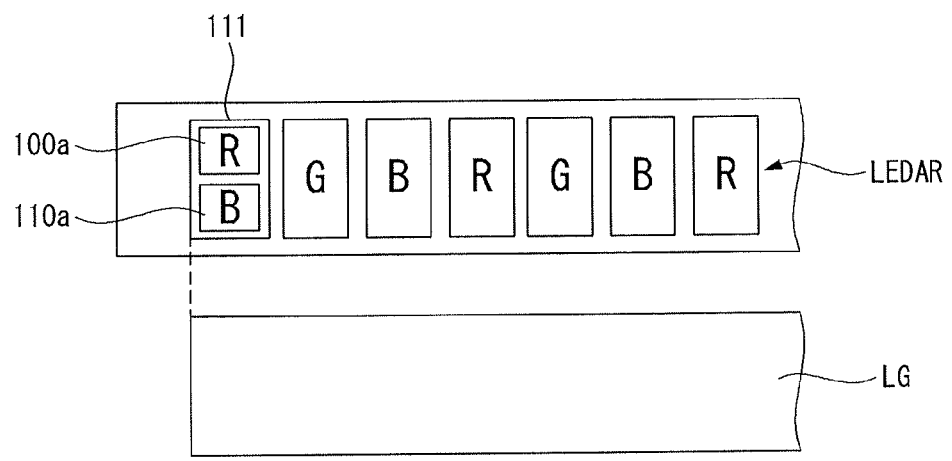
FIG. 13E is a diagram illustrating the LED array according to the tenth embodiment of the present disclosure.

The eighth embodiment is the example in which the first (or the last) red LED 100 and the additional blue LED 110 (or additional green LED 120) are disposed athwart each other. FIG. 12F is a diagram illustrating the LED array according to the eighth embodiment of the present disclosure. Referring to FIG. 12A, between the leftmost (or the rightmost) two LEDs disposed at the upper side and the lower side, the additional blue LED 110 disposed farther from the LCD panel LCDP is screened by the red LED 100 disposed closer to the LCD panel LCDP so that the lights from the first red LED 100 and the additional blue LED 110 are not evenly mixed. Therefore, as shown in FIG. 12F, the red LED 100 positioned upper side would be preferably shifted to the outside of the area covered by the light guide LG. As a result, some gap portions are ensured to radiate more amount of blue light from the additional blue LED 110 positioned at lower side than seventh embodiment so that the lights from the first red LED 100 and the additional blue LED 110 can be more evenly mixed. Similarly, by applying this LED array to the cases shown in FIGS. 12B to 12D, the upper LED can be disposed outward from these positions. The athward shifting amount of the upper LED is decide in manner that the ¼ portion of the lower LED is exposed through the gap formed by shifting the upper LED.

For the ninth embodiment, the first (or the last) red LED 100 and the additional blue LED 110 (or the additional green LED 120) has the half size of that of the other LEDs composing the LED array LEDAR. By reducing the size of the outermost LEDs in half size according to the ninth embodiment, the light amount corresponding to the halfed size is incident into the light guide LG. In other words, by making the leftmost (or the rightmost) LEDs in square shape having the half size of the other LEDs, all LEDs of the LED array LEDAR can be included within the area covering the light guide LG. FIGS. 13A to 13D are diagrams illustrating the LED arrays according to the ninth embodiment of the present disclosure. FIGS. 13A to 13D are explaining the cases having a squared red LED 100a and a squared blue LED 110a or a squared green LED 120a in which the leftmost (or the rightmost) LEDs have the half size of the leftmost (or the rightmost) LEDs shown in FIGS. 12A to 12D, respectively.

Furthermore, for the tenth embodiment, the squared red LED 100a and the squared blue LED 110a (or the squared green LED 120a) are packed in one single LED package 111. As mentioned in the ninth embodiment, when the leftmost (or the rightmost) LEDs are made to have the half size in order to include them within the light guided LG region, the mounting process may be complexed because the outermost LEDs have different size from the other LEDs. Therefore, it may cause the mounting errors or the mounting process may comprise two steps for mounting large size LEDs and small size LEDs separately. To solve these drawbacks, the small LEDs are packed in one single LED package 111 and then the single LED package 111 is mounted with the other LEDs via one mounting process.

Figure 14A:
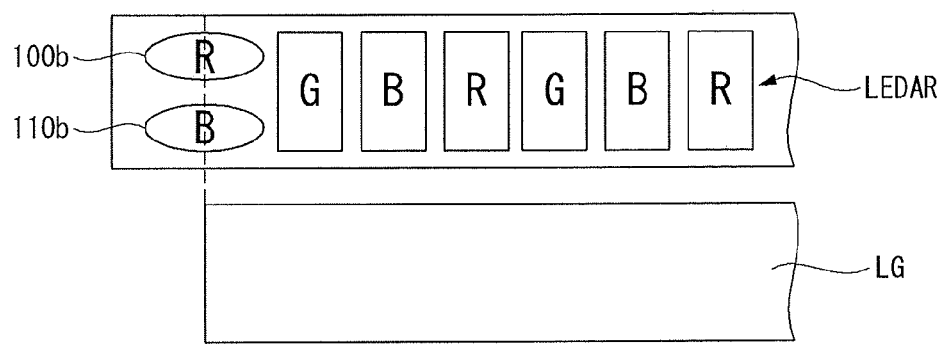
FIG. 14A is a diagram illustrating the LED array having an oval type LED according to the eleventh embodiment of the present disclosure.
Figure 14B:
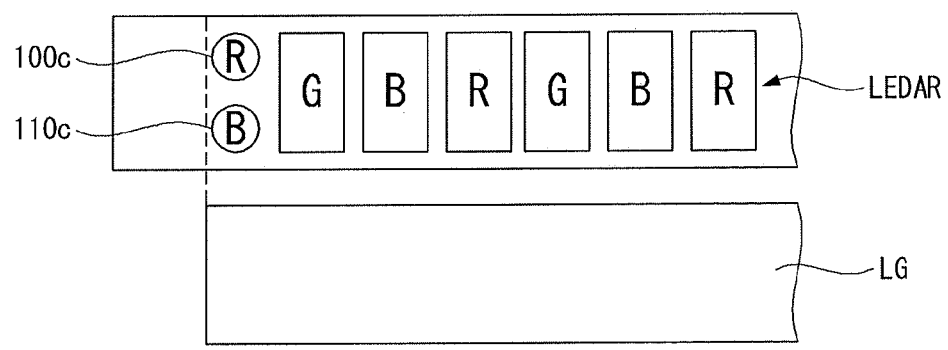
FIG. 14B is a diagram illustrating the LED array having a circular type LED according to the eleventh embodiment of the present disclosure.

For further embodiments, the shape of the LEDs disposed at leftmost (or rightmost) side is not restricted to the rectangular or square shape. For the eleventh embodiment of the present disclosure, the outermost LEDs have different shapes from rectangular shape. The oval type LED can be applied to the outermost rectangular LEDs of the FIGS. 12A to 12D showing the seventh embodiment. FIG. 14A is a diagram illustrating the LED array having an oval type LED according to the eleventh embodiment of the present disclosure. Referring to FIG. 14A, the first (or the last) red LED 100 and the additional blue LED 110 are replaced with the oval red LED 100b and the oval blue LED 110b, respectively. Otherwise, the circle type LED can be applied to the outmost square LEDs of the FIGS. 13A to 13D. FIG. 14B is a diagram illustrating the LED array having a circular type LED according to the eleventh embodiment of the present disclosure. Referring to FIG. 14B, the first (or the last) red LED 100 and the additional blue LED 110 are replaced with the circle red LED 100c and the circle blue LED 110c, respectively.

Until now, we explained some embodiments for solving the redish problem of the edge type back light system in which light from the outermost red LED is outstandingly represented by changing the LED array layout without any additional device or means. Now, referring to FIGS. 15 to 18B, explained are some embodiments for solving the redish problem occurred in the direct type back light system. Hereinafter, for the direct type back light unit, rectangular type LED is mainly used for explaining the embodiments, because the rectangular type is easy to change the LED array layout. As the main feature of the present disclosure is that only some portions of the outermost LED are included within the area covered by the LCD panel, the LED array layout may be similar with the first embodiment.

Figure 15:
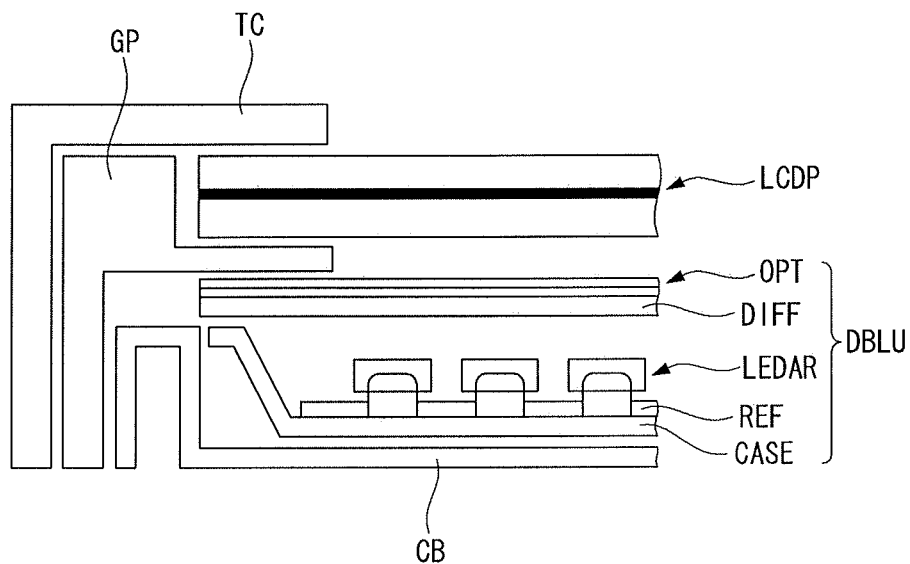
FIG. 15 is a diagram illustrating the direct type back light unit having an LED array according to the present disclosure.

FIG. 15 is a diagram illustrating the direct type back light unit having an LED array LEDAR according to the present disclosure. Referring to FIG. 15, the direct type back light unit DBLU comprises a diffusion sheet DIFF and optical sheets OPT disposed between the liquid crystal display panel LCDP and the LED array LEDAR. The LED array LEDAR comprising a plurality of LEDs is disposed under the diffusion film DIFF and on the bottom of the light source housing CASE. Between the light source housing CASE and the LED array LEDAR, a reflective sheet REF is disposed. A guide panel GP encloses the side portions of the LCD panel LCDP and the direct type back light unit DBLU, and supports the LCD panel at between the LCD panel LCDP and the optical sheets OPT. A cover bottom CB houses the bottom portion of the direct type back light unit DBLU. A top case TB encloses the side portions of the LCD panel LCDP and the guide panel GP.

Figure 16:
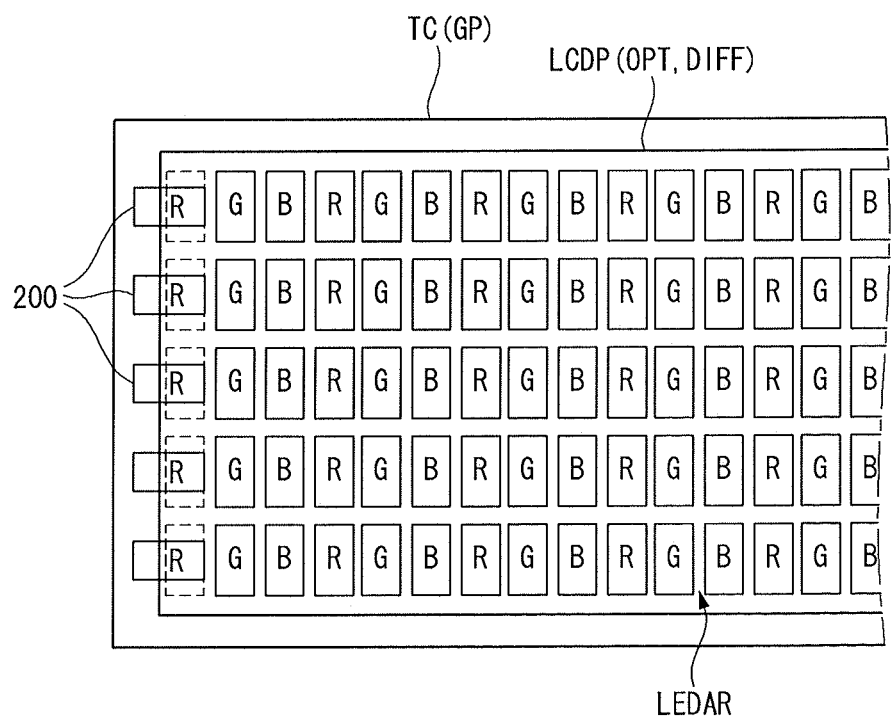
FIG. 16 is a diagram illustrating the LED array according to the twelvth embodiment of the present disclosure.

FIG. 16 is a diagram illustrating the LED array according to the twelvth embodiment of the present disclosure. FIG. 16 shows the arraying layout of the LED array LEDAR with the diffusion film DIFF, the optical sheets OPT and the LCD panel LCDP enclosed by the top case TC and the guide panel GP.

When the LED array LEDAR may have the R-G-B type layout, a plurality of the red LEDs can be linearly disposed along the first (or the last) side. In that case, the red color radiated from the outermost arrayed red LEDs may be outstandingly shown. To solve this redish problem, the twelvth embodiment comprises the first (or the last) red LED 200 mounted in horizontally long direction. The outermost arrayed LED may be the blue LEDs or the green LEDs. In detail, the LEDs for the direct type back light unit can have rectangular shape. Most of all R-G-B LEDs are disposed in vertically long direction. Further, only the LEDs disposed at first (or the last) vertical side are disposed in horizontally long direction.

As the dotted line shown in FIG. 16, if the first (or the last) red LEDs 200 are mounted in vertically long direction, all LEDs of the LED array LEDAR are included within the area covered by the plane area of the diffusion film DIFF, the optical sheets OPT and the LCD panel LCDP. At the right side of the first red LEDs 200, the red color can be mixed with the green color of the green LED, but at the left side of the first red LEDs 200, there is no other color LEDs. Therefore, the red light from the first red LEDs 200 radiates from the left side of the direct back light unit more strongly. However, as the solid line shown in FIG. 16, if the first (or the last) red LEDs 200 are mounted in horizontally long direction, one half portion of the first red LEDs 200 is included within the area covered by the plane area of the diffusion film DIFF, the optical sheets OPT and the LCD panel LCDP, but the other half portion of the first red LEDs 200 is excluded from the area covered by the plane area of the diffusion film DIFF, the optical sheets OPT and the LCD panel LCDP. As a result, the light amount radiating to the LCD panel LCDP from the first (or the last) red LEDs is reduced in half so that the redish problem is not occurred.

Figure 17:
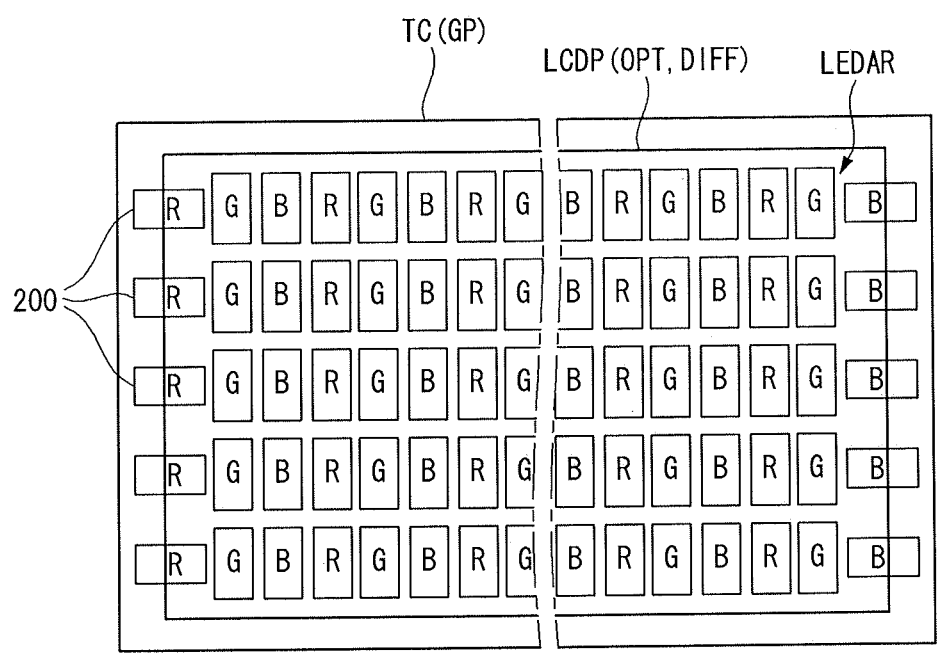
FIG. 17 is a diagram illustrating the LED array according to the thirteenth embodiment of the present disclosure.

FIG. 17 is a diagram illustrating the LED array according to the thirteenth embodiment of the present disclosure. Referring to FIG. 17, when the blue LEDs (or the green LEDs) are disposed along the rightmost side, the blue LEDs (or the green LEDs) can be mounted in horizontally long direction as the first red LEDs 200 at the leftmost side. In this case, the color problem by the blue or green light is not serious than the redish problem. However, in some cases, the blueish or greenish problem may cause the degradation of the back light quality. By changing the LED array layout as shown in FIG. 17, the blueish (or greenish) problem occurred at the rightmost side can be solved.

Figure 18A:
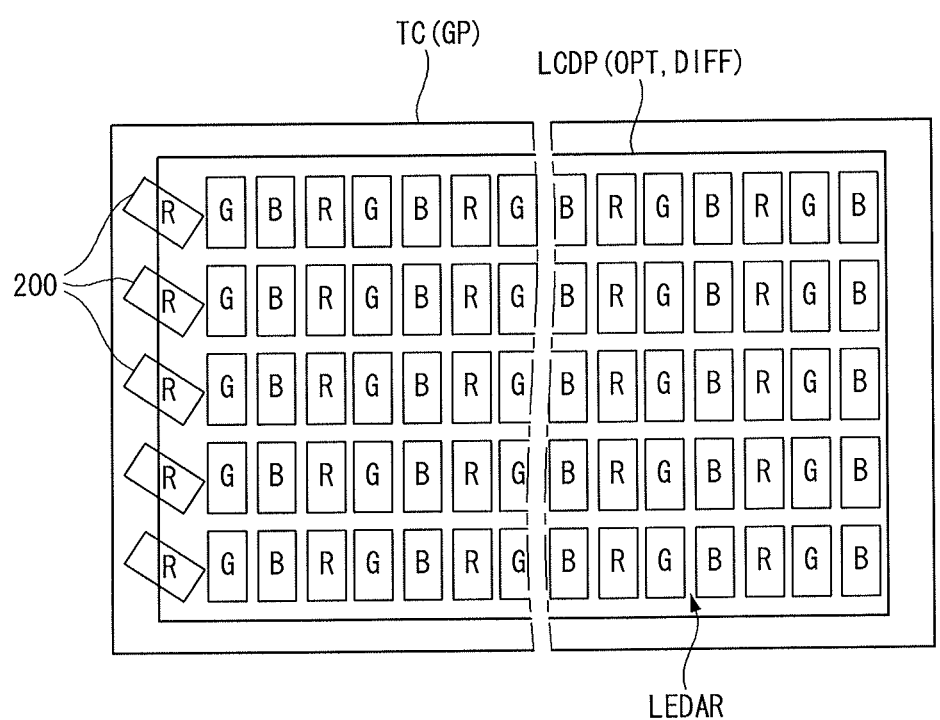
FIG. 18A is a diagram illustrating the LED array according to the fourteenth embodiment of the present disclosure.
Figure 18B:
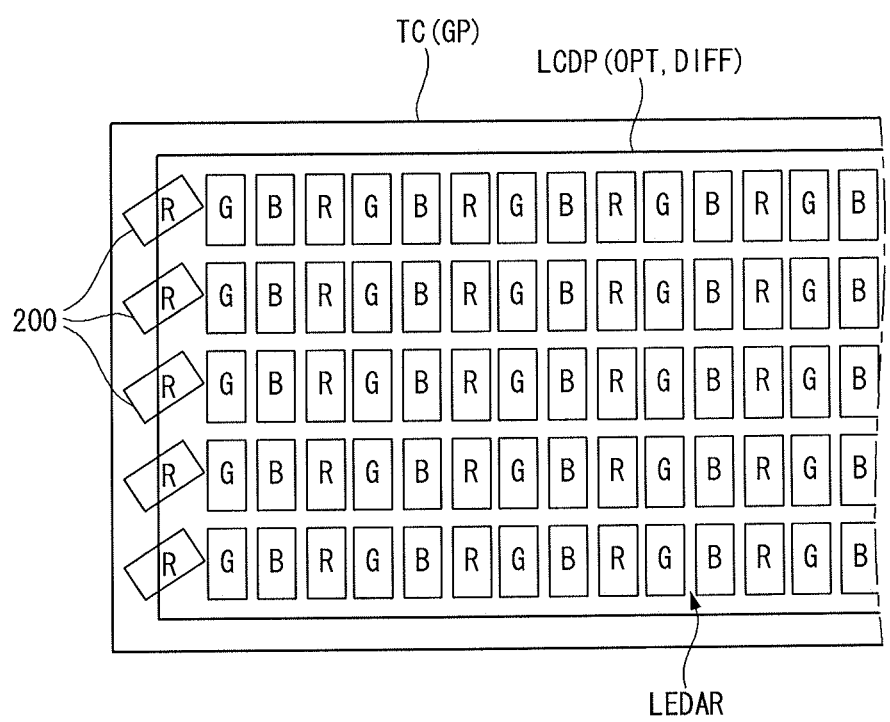
FIG. 18B is a diagram illustrating the LED array according to the fifteenth embodiment of the present disclosure.

Furthermore, referring to FIGS. 18A and 18B, the outermost red LEDs 200 can be arrayed in diagonally long direction. FIG. 18A is a diagram illustrating the LED array according to the fourteenth embodiment of the present disclosure in which the outermost LEDs are disposed along the diagonal line from left upper corner to the right lower corner. FIG. 18B is a diagram illustrating the LED array according to the fifteenth embodiment of the present disclosure in which the outermost LEDs are disposed along the diagonal line from right upper corner to the left lower corner.

In addition, even though it is not explained using diagrams, the concepts of embodiments 7 to 9 for the edge type back light unit EBLU can be applied to the direct type back light unit DBLU.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

The invention claimed is:

1. A liquid crystal display device comprising:
   a liquid crystal display panel;
   an optical sheet disposed under the liquid crystal display panel;
   a light guide disposed under the optical sheet for receiving light from one side surface, diffusing the light and radiating the light through a surface facing with the optical sheet and the liquid crystal display panel;
   an LED array having red LEDs, green LEDs and blue LEDs sequentially arrayed under the optical sheet; and
   an additional LED,
   wherein the LED array is disposed to face the side surface,
   wherein each LED of the LED array has a rectangular shape;
   wherein an outermost LED of the LED array is arrayed horizontally, and other LEDs are arrayed vertically, such that one portion of the outermost LED of the LED array is included within an area covered by the liquid crystal display panel, and other portion of the outermost LED of the LED array is excluded from the area covered by the liquid crystal display panel;
   wherein the outermost LED arrayed horizontally is located at an upper position of the other LEDs arrayed vertically;
   wherein the additional LED is disposed under the outermost LED arrayed horizontally; and
   wherein the outermost LED, the additional LED and a closest LED of the other LEDs arrayed vertically have an RGB combination.

2. The device according to the claim 1, further comprising a diffusion film disposed under the optical sheet;
   wherein the LED array is disposed under the diffusion film to face a plane surface of the diffusion film, the optical sheet and the liquid crystal display panel;
   wherein each LED of the LED array has a rectangular shape.

3. The device according to the claim 1, wherein the outermost LED is a red LED.

4. The device according to the claim 1, wherein the one portion of the outermost LED of the LED array is selected to have a ratio value from 30% to 70%.

5. The device according to the claim 1, wherein an area ratio between the one portion of the outermost LED include into the area covered by the liquid crystal display panel and the other portion of the outermost LED excluded from the area covered by the liquid crystal display panel is 1:1.

* * * * *